(12) United States Patent
Brett et al.

(10) Patent No.: US 10,209,345 B2
(45) Date of Patent: Feb. 19, 2019

(54) SIGNAL PROCESSING UNIT AND METHOD FOR SEARCHING FOR PEAKS IN A TWO-DIMENSIONAL MATRIX

(71) Applicant: FREESCALE SEMICONDUCTOR, INC., Austin, TX (US)

(72) Inventors: Maik Brett, Taufkirchen (DE); Deboleena Sakalley, Ghaziabad (IN); Rohit Tomar, Edinburgh (GB)

(73) Assignee: NXP USA, Inc., Austin, TX (US)

( * ) Notice: Subject to any disclaimer, the term of this patent is extended or adjusted under 35 U.S.C. 154(b) by 399 days.

(21) Appl. No.: 15/031,073

(22) PCT Filed: Oct. 21, 2013

(86) PCT No.: PCT/IB2013/059508
§ 371 (c)(1),
(2) Date: Apr. 21, 2016

(87) PCT Pub. No.: WO2015/059514
PCT Pub. Date: Apr. 30, 2015

(65) Prior Publication Data
US 2016/0266238 A1   Sep. 15, 2016

(51) Int. Cl.
*G01S 3/74* (2006.01)
*G01S 13/42* (2006.01)
(Continued)

(52) U.S. Cl.
CPC .............. *G01S 7/292* (2013.01); *G01S 3/74* (2013.01); *G01S 13/42* (2013.01);
(Continued)

(58) Field of Classification Search
CPC .......... G01S 7/292; G01S 7/354; G01S 13/34; G01S 13/50; G01S 13/5244; G01S 13/53;
(Continued)

(56) References Cited

U.S. PATENT DOCUMENTS

| | | | | |
|---|---|---|---|---|
| 5,416,488 A | * | 5/1995 | Grover | G01S 7/2927 342/109 |
| 5,455,846 A | * | 10/1995 | Gardner | H04L 27/00 375/340 |

(Continued)

FOREIGN PATENT DOCUMENTS

JP   2005221241 A   8/2005

OTHER PUBLICATIONS

Latha et al., "Comparative analysis of peak-detection techniques for comprehensive two-dimensional chromatography", Journal USA, Mar. 18, 2011, Published by Elsevier B.V., 7 pages, Journal of Chromatography A, 1218 (2011) 6792-6798.

(Continued)

*Primary Examiner* — Peter M Bythrow (57) ABSTRACT

A signal processing unit and a method for searching for peaks in a two-dimensional matrix of numbers are described. The matrix is analyzed row by row and then column by column. Analyzing a row comprises, for each element of the row, tagging the element in response to determining that the element is a local maximum of the row Analyzing a column comprises determining a bit field associated with the column by determining, for each element of the column, a corresponding bit field element Determining the bit field element comprises: if the element of the column has not been tagged, setting the bit field element to a predefined first value, and, if the element of the column has been tagged, determining whether the element is a local maximum and, in this case, setting the bit field element to a predefined second value different from the first value and, otherwise, setting the bit field element to the first value.

15 Claims, 5 Drawing Sheets

(51) Int. Cl.
- *G01S 13/53* (2006.01)
- *G01S 13/58* (2006.01)
- *G01S 7/292* (2006.01)
- *G01S 13/524* (2006.01)
- *G01S 13/532* (2006.01)

(52) U.S. Cl.
CPC ........... *G01S 13/5244* (2013.01); *G01S 13/53* (2013.01); *G01S 13/532* (2013.01); *G01S 13/58* (2013.01); *G01S 13/582* (2013.01); *G01S 13/583* (2013.01)

(58) Field of Classification Search
CPC ........ G01S 13/532; G01S 13/56; G01S 13/58; G01S 13/582; G01S 13/583
See application file for complete search history.

(56) References Cited

U.S. PATENT DOCUMENTS

| | | |
|---|---|---|
| 7,463,899 B2 | 12/2008 | Riley et al. |
| 7,474,258 B1 * | 1/2009 | Arikan .................... G01S 7/292 |
| | | 342/107 |
| 8,305,261 B2 * | 11/2012 | Hunter ................ G01S 13/5244 |
| | | 342/159 |
| 2005/0174826 A1 | 8/2005 | Alexander |
| 2005/0288872 A1 | 12/2005 | Old et al. |
| 2009/0045326 A1 | 2/2009 | Sato et al. |
| 2012/0257829 A1 * | 10/2012 | Fam .................... H04L 27/0006 |
| | | 382/171 |
| 2017/0192847 A1 * | 7/2017 | Rao ......................... G01S 7/352 |

OTHER PUBLICATIONS

Sanz et al., "Computing Minima and Maxima of Digital Images in Pipeline Image Processing Systems Without Hardware Comparators", Proceedings of the IEEE, vol. 73, No. 8, Aug. 1985, 3 pages.

Ludloff, Albrecht K., "Praxiswissen Radar und Radarsignalverarbeitung", Oct. 28, 2008, Germany Published by Vieweg+Teubner Verlag, Chapter 9.

International Search Report for application No. PCT/IB2013/059508, dated Jul. 17, 2014, 13 pages.

* cited by examiner

EXAMPLE A

EXAMPLE B

EXAMPLE C

FIG. 4

| | | | | 5 | | | | 14 | |
|---|---|---|---|---|---|---|---|---|---|
| | | | | 32 | | | | 39 | |
| 22 | 1 | 14 | 18 | 68 | 31 | 10 | 24 | 55 | 4 |
| | | | | 12 | | | | 23 | |
| | | | | 8 | | | | 15 | |

FIG. 5

TAG

| 22 | 1 | 14 | 18 | 68 TAG | 31 | 10 | 24 | 55 TAG | 4 |
|---|---|---|---|---|---|---|---|---|---|

BIT-FIELD

| 22 | 1 | 14 | 18 | 68 | 31 | 10 | 24 | 55 | 4 |
|---|---|---|---|---|---|---|---|---|---|

| 0x22 | 0 | 0 | 0 | 0 | 1 | 0 | 0 | 0 | 1 | 0 |
|---|---|---|---|---|---|---|---|---|---|---|

FIG. 6

| 0 | 0 | 0 | 0 | 0 | 0 | 0 | 0 | 0 |
|---|---|---|---|---|---|---|---|---|
| 1 | 0 | 1 | 0 | 0 | 0 | 1 | 0 | 0 |
| 2 | 0 | 0 | 0 | 0 | 0 | 0 | 0 | 0 |
| 3 | 0 | 0 | 0 | 0 | 0 | 0 | 0 | 0 |
| 4 | 0 | 0 | 0 | 0 | 0 | 0 | 0 | 0 |
| 5 | 0 | 0 | 0 | 0 | 1 | 0 | 0 | 0 |
| 6 | 0 | 0 | 0 | 0 | 0 | 0 | 0 | 0 |
| 7 | 1 | 0 | 0 | 0 | 0 | 0 | 1 | 0 |

1, 0x44
5, 0x8
7, 0x82

SIGNAL PROCESSING UNIT AND METHOD FOR SEARCHING FOR PEAKS IN A TWO-DIMENSIONAL MATRIX

FIELD OF THE INVENTION

This invention relates to a signal processing unit and to a method for searching for peaks in a two-dimensional matrix.

BACKGROUND OF THE INVENTION

A radar device is an apparatus for detecting distant objects by means of electromagnetic radiation emitted by the radar device and reflected by the distant objects. The electromagnetic radiation may, for instance, be in a frequency range of more than one gigahertz. Today, an ever increasing number of street vehicles comprise a radar device for detecting obstacles that may pose a potential threat to the vehicle. The electromagnetic radiation emitted by the radar device may also be referred to as the radar wave. An object to be detected by the radar device may also be referred to as a target. Different types of radar devices are known in the art. These include range Doppler devices, beam forming devices, and combined range Doppler and beam forming devices. Range detection serves to determine the distance between the radar device and a target based on the delay between emission of a radar pulse and reception of a reflected part of the radar pulse. Doppler detection serves to determine the relative speed between the radar device and the target based on the Doppler effect. Beam forming can be used, for example, to determine an azimuth of the target or for direction-sensitive detection.

Part of the electromagnetic radiation emitted by the radar device may be backscattered to the radar device and evaluated to generate a two-dimensional or three-dimensional array of real or complex numbers representative of the detected backscattered radar wave. This data may be derived from the output signals generated by a set of reception antennas in response to the received backscattered radar wave, and it may therefore be referred to herein as the reception data. The reception data, i.e., a two-dimensional or three dimensional matrix, may be secondary reception data generated from primary reception data by, e.g., a two-dimensional or three-dimensional Fourier transform.

The positions of targets in an environment of the radar device may be found by determining local maxima (peaks) in the two-dimensional or three-dimensional array of reception data. The coordinates of the peaks may have to be extracted from large amounts of data. Searching for peaks may be computationally intensive and may account for most of the processing time in a radar system. An efficient algorithm and a high throughput implementation may therefore be desired. It may further be desired to store the coordinates of the peaks in an efficient manner in order to save memory.

SUMMARY OF THE INVENTION

The present invention provides a signal processing unit and a method for searching for peaks in a two-dimensional matrix as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Because the illustrated embodiments of the present invention may, for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Figure 1:
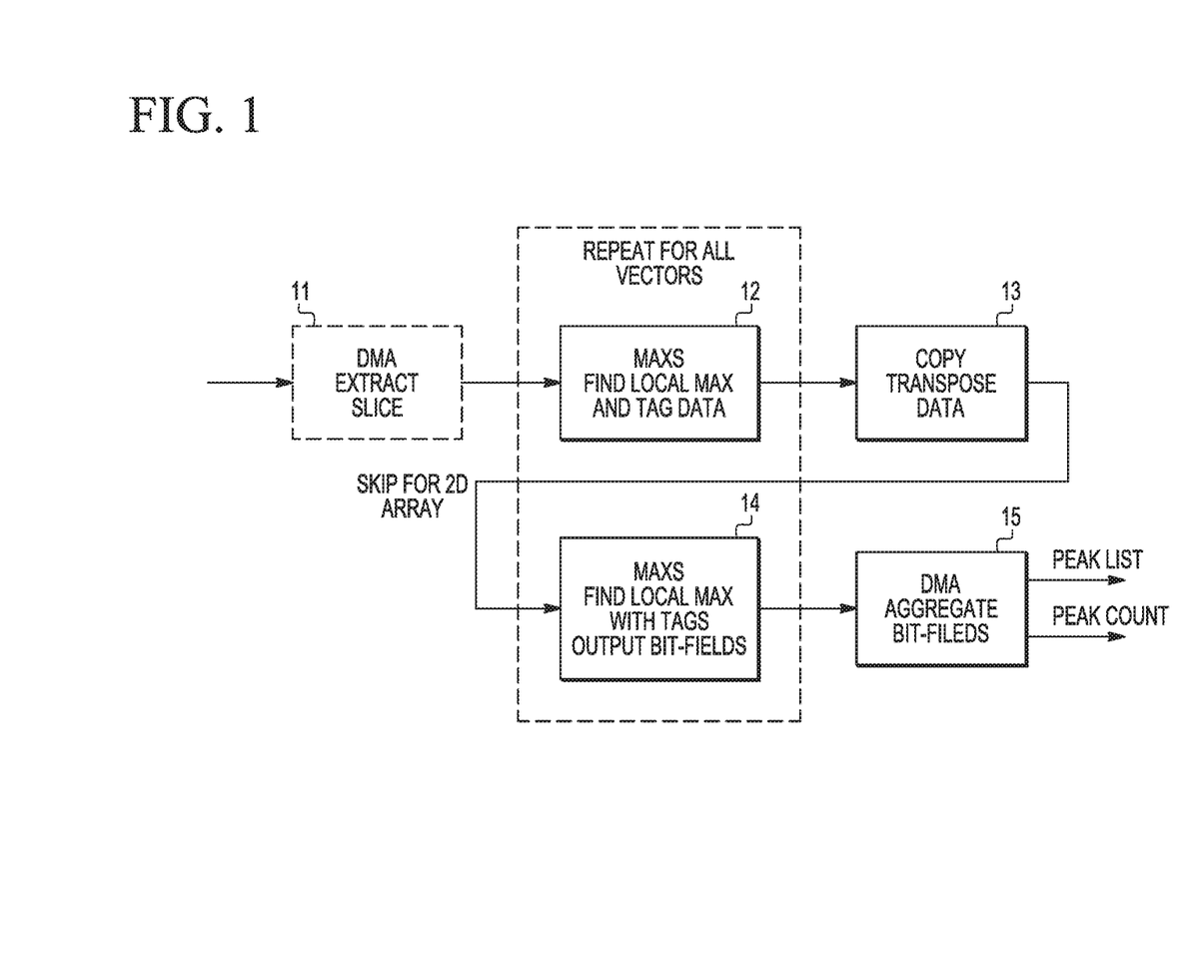
FIG. 1 shows a flow chart of an example of an embodiment of a method of searching for peaks in a two-dimensional matrix.

The flow chart in FIG. 1 schematically illustrates an example of a method of searching for peaks in a two-dimensional matrix. The elements of the matrix may be real valued or complex valued. The method involves analyzing the matrix row by row and then column by column. Analyzing a row of the matrix comprises determining for each element of the row whether the element is a local maximum of the row and, in this case, tagging the element. In accordance with a first definition, a local maximum of the row is an element of the row which is greater than the neighboring elements of the row. In accordance with a second definition, a local maximum of the row is an element of the row which is greater than or equal to the neighboring elements of the row. This second definition may in practice be more beneficial than the first one, because it may occur that a group of two or more neighboring elements are equal-valued and greater than the elements adjoining the group, in which case the entire group may be considered a local maximum. In accordance with a third definition, a local maximum of the row is an element which is greater than its left neighbor in the row and greater than or equal to its right neighbor. In accordance with a fourth definition, a local maximum of the row is an element which is greater than or equal to its left neighbor and greater than its right neighbor. The third definition and the fourth definition may be particularly convenient, as they imply the existence of a single isolated maximum, rather than a group of adjoining maxima, and can also be found with a low computational effort, i.e., in a single run over the row in question. Optionally, a threshold may be introduced in conjunction with the first, second, third, and fourth definition, respectively, so that an element of a row must also be greater than the threshold for it to qualify as a local maximum. Furthermore, the first and the last element of the row or column may be considered nearest neighbors. In other words, the respective row or column may be thought of as a circle, the first element and the last element thus lying next to each other. Tagging means assigning a tag to the element in question. A tag assigned to an element thus indicates that the element is a local maximum of the row. The tags thus associated with individual elements of a row may, for example, be provided in the form of a list indicating the respective elements. Elements mentioned in the list are thus considered tagged, whereas elements not mentioned in the list are considered not tagged. Alternatively, a tag may, for example, be implemented by providing a status bit for each element of the row, the status bit having two possible values, namely, "not tagged" and "tagged", or, equivalently, one and zero.

A row is a horizontal line of a matrix. A column is a vertical line of the matrix. However, the expressions horizontal and vertical have no absolute meaning and are therefore interchangeable. Accordingly, the expressions row and column are also interchangeable, i.e., rows may be considered columns provided that columns are considered rows, and vice versa.

Analyzing a column may comprise determining a bit field associated with the column by determining a corresponding bit field element for each element of the column. Determining the bit field element may comprise, for example, setting the bit field element either to a first value or to a second value, namely in dependence on whether the corresponding element of the column has been tagged or not. If the element of the column has not been tagged, the bit field element is set to a first value. If, however, the element of the column has been tagged, it is determined whether the element is a local maximum, and the bit field element may, in this case, be set to a second value. The first value and the second value may, for example, be zero and one, respectively.

The method may further comprise generating an aggregated list consisting of those bit fields that include at least one bit field element having the second value.

The two-dimensional matrix may, for example, be one slice or layer of a three-dimensional matrix. In block 1.1 (see FIG. 1), the two-dimensional matrix may be provided by, e.g., retrieving it from a memory unit. The memory unit may, for example, be a random access memory unit such as the operand RAM shown in the signal processing unit 10 in FIG. 2. The matrix may be retrieved, for example, via a direct memory access (DMA) controller. Block 1.1 may be skipped in an example in which the two-dimensional matrix is not part of a three-dimensional matrix.

Still referring to FIG. 1, the two-dimensional matrix may be analyzed row by row. For each row, the local maxima of the row may be found and the respective elements of the row may be tagged. Block 1.2, i.e., the operation of analyzing a row, may be performed using a dedicated maximum search engine (MAXS). The maximum search engine may, for example, comprise a buffer for buffering a single row of the matrix. The rows of the two-dimensional matrix may thus be processed successively by the maximum search engine. The same maximum search engine may also be used for the subsequent phase of analyzing the matrix column by column. To this end, the matrix may be transposed (block 1.3), and the rows of the transposed matrix, i.e., the columns of the non-transposed matrix, may be fed along with the corresponding tags to the maximum search engine. Each column of the matrix (row of the transposed matrix) may thus be analyzed by the maximum search engine to find local maxima of the respective column. Only those elements of the matrix that were tagged in block 1.2 need to be examined in block 1.4.

Block 1.4 may include determining a bit field consisting of bit field elements associated with the elements of the column input to block 1.4. Each element of the bit field may be either zero or one, for example. The value of zero indicates that the corresponding element of the matrix is not a local maximum of the matrix. In contrast, a value of one indicates that the corresponding element of the matrix is a local maximum of the matrix. Each row of the two-dimensional matrix may thus be associated with a corresponding bit field. Equivalently, it may be stated that each element of the two-dimensional matrix may be assigned a binary variable, namely the corresponding bit field element, to indicate whether the respective matrix element is a local maximum or not. It may be recalled at this point that an element of the two-dimensional matrix is a local maximum of the matrix if and only if it is a local maximum in both the horizontal and the vertical direction, i.e., a local matrix of both the respective column and the respective row. The list of bit fields corresponding to the list of columns of the two-dimensional matrix may be referred to as a bit field list. In a typical scenario, a large number of the bit fields do not contain any non-zero entry because the corresponding column of the two-dimensional matrix does not contain any local maxima. In order to save memory, the bit field list may therefore be expressed in a compressed manner by retaining only those bit fields which contain at least one positive entry. In other words, those bit fields which contain at least one positive element may be aggregated to form an aggregated list of bit fields (block 1.5). A peak list and a peak count may be derived from the aggregated list.

Figure 2:
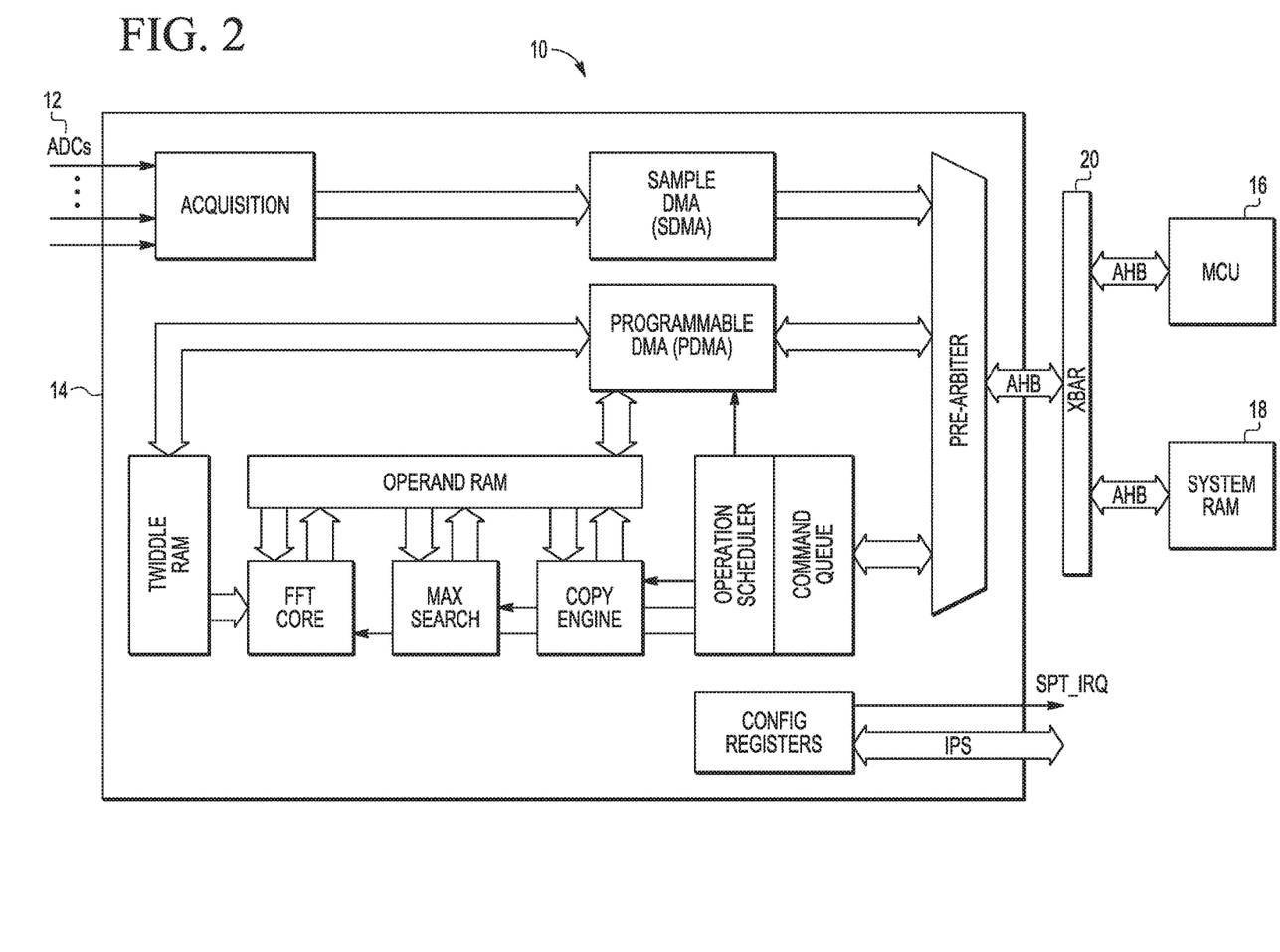
FIG. 2 schematically shows an example of an embodiment of a signal processing unit.

Referring now to FIG. 2, an example of a signal processing unit 10 is schematically illustrated. The signal processing unit 10 is arranged to search for peaks in a two-dimensional matrix of numbers. It may, for example, be integrated in a radar device. The signal processing unit 10 may incorporate further functions in addition to that of searching for peaks. Such further functions are not necessarily described in the present.

The signal processing unit 10 may notably comprise an analog to digital converter (ADC) connected to a set of reception antennas (not shown) for providing a digital representation of a received radar signal. This digital representation may be referred to as the digital reception signal. The digital reception signal from the ADC 12 may further be processed by a signal processing toolbox (SPT) 14. The SPT 14 may further be connected, for example, to a microcontroller unit (MCU) 16 and to a system RAM 18, via, e.g., a crossbar switch 20. The MCU 16 may be arranged to configure the SPT 14, e.g., by providing configuration data to the SPT 14 via, e.g., the crossbar switch 20.

The SPT 14 may be arranged to generate a two-dimensional matrix or a set of two dimensional matrices, on the basis of the digital reception signal and to store the matrix, or the set of matrices, in, e.g., the system RAM 18. The SPT 14 may further comprise a maximum search engine connected to, e.g., an operand RAM. The maximum search engine may be arranged to search for local maxima of the two-dimensional matrix retrieved from, e.g., the operand RAM. As explained above, the definition of a local maximum may depend to a certain extent on the specific implementation in question.

The operation of comparing any two elements of the matrix may include or consist in comparing the magnitudes of the values of the respective elements against each other. It is recalled that the values of the matrix elements may be real or complex numbers, and it is noted that there may be various options for defining the magnitude of a number. The magnitude $|x|$ of a real number x may, for example, be defined as $|x|=abs(x)$ wherein $abs(x)=x$ if $x\geq 0$ and $abs(x)=-x$ if $x<0$. The magnitude of a complex number z may, for example, be defined as $|z|=mag(z)=sqrt(z*cc(z))$, or, alternatively, as $|z|=ssq(z)=z*cc(z)$, or, alternatively, as $|z|=db(z)=\log(z*cc(z))$ if $z*cc(z)>0$ and $|z|=db(z)=0$ if $z=0$. It is noted that the magnitude function $db(z)$ thus defined is not continuous in $z=0$ but nevertheless satisfies its purpose. "cc" means the complex conjugate.

Figure 3:
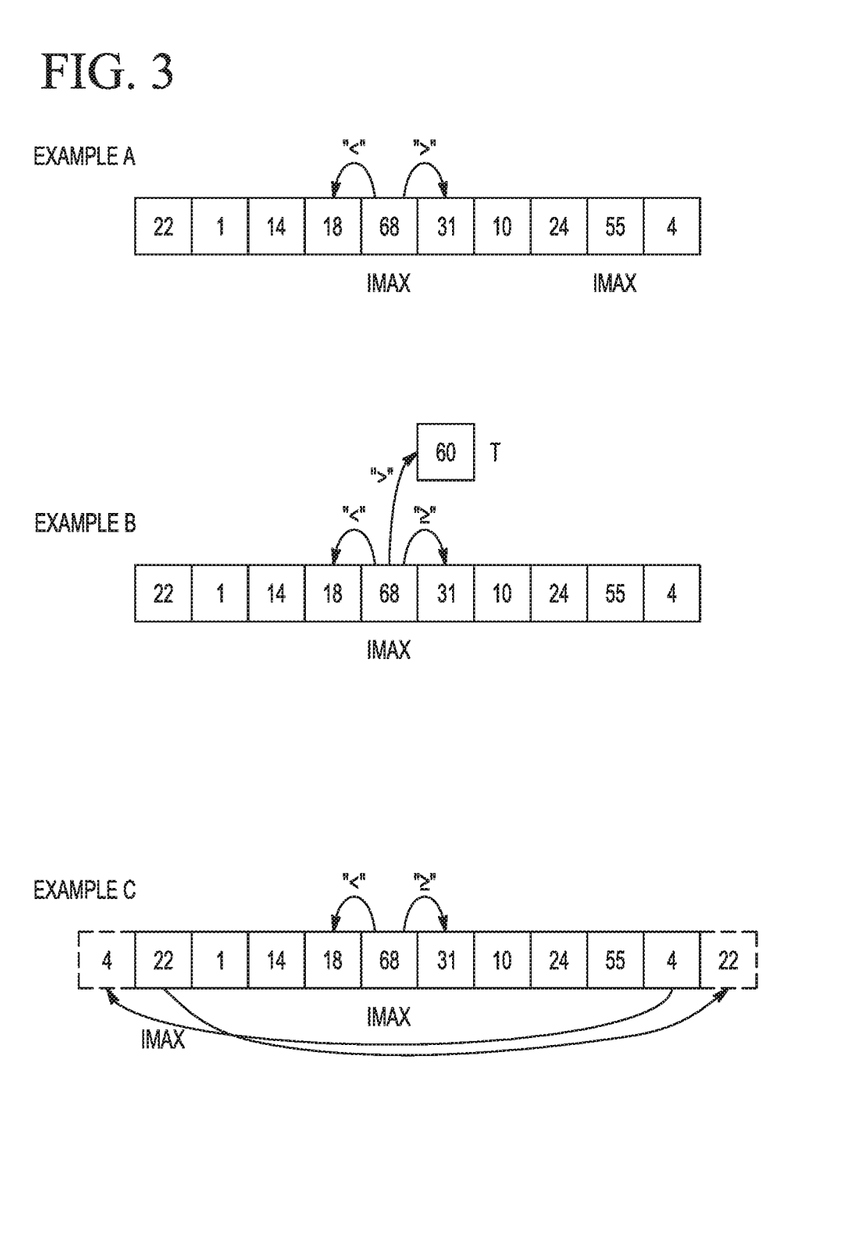
FIG. 3 schematically illustrates an example of a line of a matrix and three different ways of determining whether a particular element of the line is a local maximum.

The conditions that may have to be satisfied by an element of a row or column for the element to qualify as a local maximum are further illustrated by means of the examples A, B, and C in FIG. 3. Referring to part A of FIG. 3, the definition of a local maximum does not include a threshold and not involve a periodicity constraint. Accordingly, the shown element of value 68 is considered a local maximum because it is greater than its left neighbor of value 18 and its right neighbor of value 31. Similarly, the shown element of value 55 is also considered to be a local maximum (Imax) because it is greater than its left neighbor of value 24 and its right neighbor of value 4.

In part B of FIG. 3, the definition of a local maximum additionally requires a local maximum to be greater than a specified threshold. In the shown example, the threshold is 60. Accordingly, the value of 68 is a local maximum because it is greater than its nearest neighboring elements 18 and 31 and is also greater than the threshold of 60. In contrast, the value of 55 is not a local maximum because it is less than the threshold of 60.

In part C of FIG. 3, the row is considered to be periodic, i.e., the rightmost element (of value 4 in the example) is considered to be the left neighbor of the first element (of value 22 in the example). Accordingly, the first element (of value 22) is a local maximum because it is greater than both its left element (of value 4) and its right neighbor (of value 1).

Figure 4:
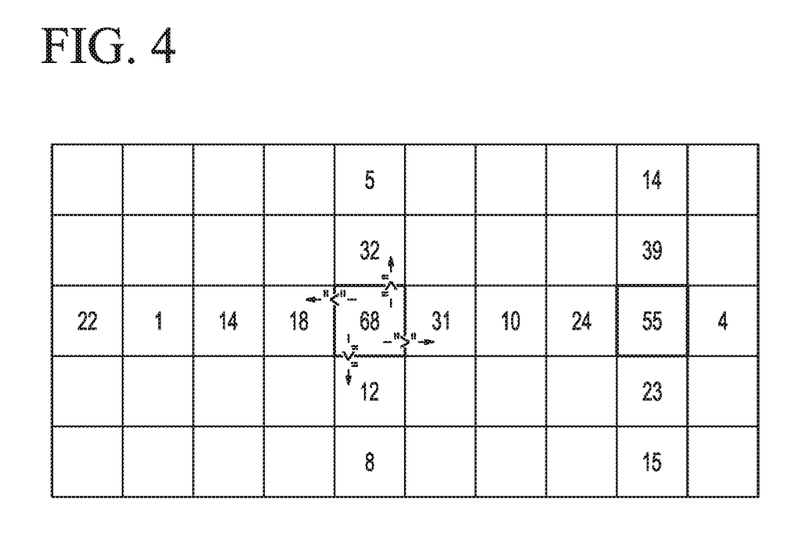
FIG. 4 schematically illustrates an example of an embodiment of a method of determining whether a certain element of a two-dimensional matrix is a local maximum.

These concepts may be generalized to multidimensional matrices. FIG. 4 shows an example of a two-dimensional matrix. In this example, the element of value 68 is a local maximum because it is greater than its nearest neighbors in the same row or column. Similarly, the element of value 55 is a local maximum because it is greater than its nearest neighbors in the same row or column.

Figure 5:
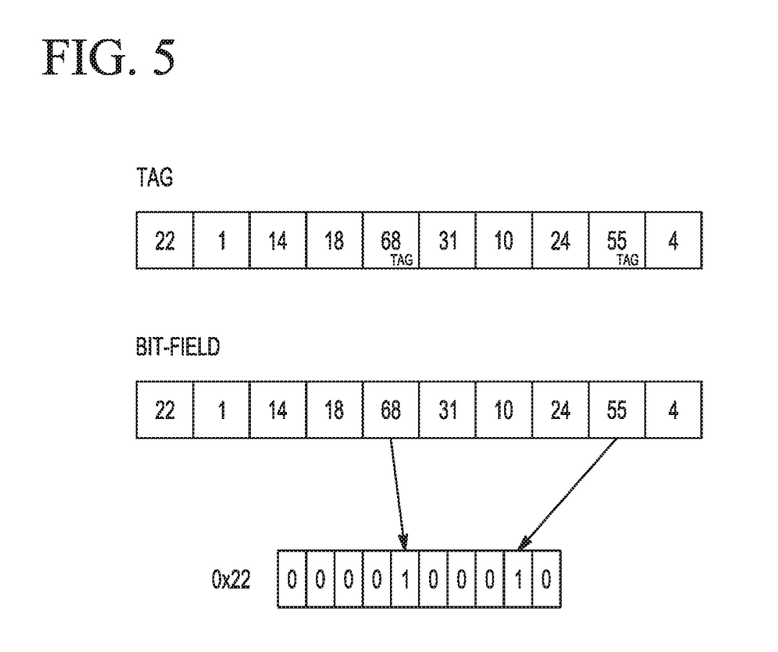
FIG. 5 schematically illustrates an example of a method of assigning tags to elements of a row of a matrix and of determining a bit field indicating the local maxima of the row in question.

FIG. 5 refers to the example of a two-dimensional matrix shown in FIG. 4. In this example, a tag is assigned to the fourth element (of value 68 in this example) of the shown row in response to determining that this element is a local maximum. Similarly, a tag is assigned to the ninth element of the row of value 55 in the example, thereby identifying it as a local maximum. The tags may be assigned in, e.g., block 1.2 of FIG. 1 as described above.

In a subsequent column-by-column analysis of the two-dimensional matrix, a bit field may be associated with the row in question. In the shown example, the bit field is 0000100010, thus indicating that the fifth and ninth elements of the row are local maxima.

In a variant of the present example, bit fields may be assigned to columns rather than rows of the two-dimensional matrix.

Figure 6:
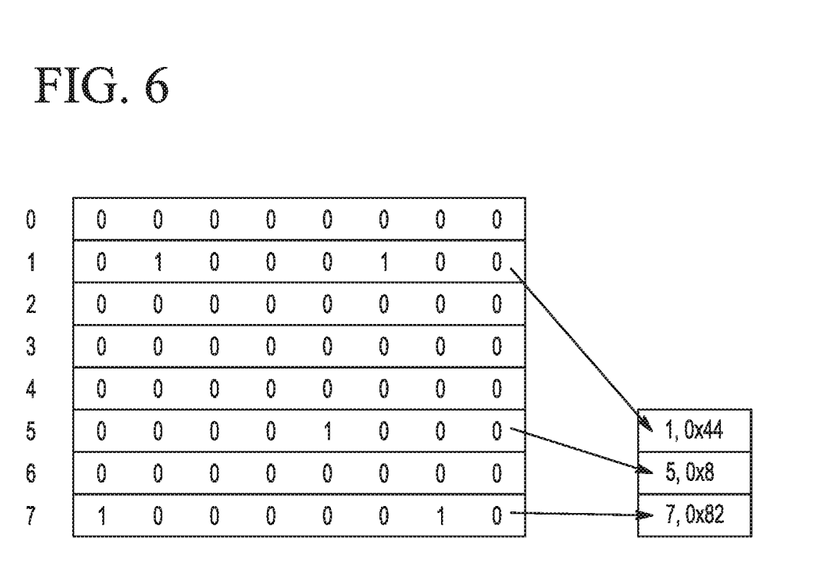
FIG. 6 schematically illustrates an example of an embodiment of a method of determining an aggregated list indicative of local maxima.

FIG. 6 schematically illustrates an example of a bit field list. The shown bit field list comprises eight bit fields numbered 0 to 7. Only bit fields 1, 5, and 7 contain non-zero entries in this example. Accordingly, an aggregated list may be formed of bit fields 1, 5, and 7. More generally, an aggregated list of bit fields may be formed of the bit fields having at least one non-zero entry.

A peak search may thus be separated into the following operations, for example: slice extraction in the case of three-dimensional data by, e.g., a copy or DMA command from a complete radar data set; local maximum search for each row; a transposition of the matrix by, e.g., a copy operation; a local maximum search for each row of the transposed matrix; and aggregating the information thus produced. In the case of a three-dimensional set, the flow may be repeated for every slice of data. The local maximum search operation for each row of the non-transposed matrix may involve tagging the local maximum at the corresponding memory positions. Transposing the matrix may involve converting rows to columns or vice versa by, e.g., one or more copy operations.

The local maximum search for each row of the transposed matrix may be based on the tags generated in the preceding row-by-row analysis of the non-transposed matrix. Data items without tags may be excluded from further consideration. The results may be written in the form of bit fields associated with the rows of the transposed or non-transposed matrix with, e.g., a "one" to mark each local maximum and, e.g., a "zero" for each matrix element that is not a local maximum.

The operation of aggregating the results may be performed by DMA. Zero-only bit fields may be skipped during the transfer. Bit fields comprising at least a single "one" entry may be transferred together with the vector number or its address. The number of non-zero bit fields may be counted. A peak list may thus be generated.

Every single operation may be implemented in hardware for high throughput. The sequence of operations may be controlled by a sequence of instructions.

The invention may also be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on transitory or non-transitory computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

The terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, a memory unit other than a RAM may be used for storing the two-dimensional matrix.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. For example, the units 12, 14, 16, 18, and 20 may be located on a single integrated circuit. Alternatively, the examples may be implemented as any number of separate integrated circuits or separate devices interconnected with each other in a suitable manner. For example, the units 12, 14, 16, 18, and 20 may be distributed across separate devices.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A signal processing unit for searching for peaks in a two-dimensional matrix of numbers, by analyzing the matrix row by row and then column by column,
   wherein analyzing a row comprises, for each element of the row, tagging the element in response to determining that the element is a local maximum of the row; and
   wherein analyzing a column comprises determining a bit field associated with the column by determining, for each element of the column, a corresponding bit field element, wherein determining the bit field element comprises:
      if the element of the column has not been tagged, setting the bit field element to a predefined first value, and,
      if the element of the column has been tagged, determining whether the element is a local maximum and, in this case, setting the bit field element to a predefined second value different from the first value and, otherwise, setting the bit field element to the first value.

2. The signal processing unit of claim 1, wherein the first value is zero and the second value is one.

3. The signal processing unit of claim 1, further arranged to generate an aggregated list, the aggregated list consisting of those bit fields that include at least one bit field element having the second value.

4. The signal processing unit of claim 1, wherein an element of a row or column is a local maximum of the row or column if it is greater than both its predecessor element and its successor element in the row or column,
   or wherein the element of the row or column is a local maximum of the row or column if it is greater than its predecessor element in the row or column and greater than or equal to its successor element in the row or column,
   or wherein the element of the row or column is a local maximum of a row or column if it is greater than or equal to its predecessor element in the row or column and greater than its successor element in the row or column.

5. The signal processing unit of claim 1, wherein a threshold is defined and wherein the element of the row or column is a local maximum of the row or column if it is greater than the threshold, greater than a first one of its predecessor element and its successor element in the row or column, and also greater than or equal to a second one of its predecessor element and its successor element in the row or column.

6. The signal processing unit of claim 1, wherein the first element of a row or column and the last element of the row or column are considered neighboring elements.

7. The signal processing unit of claim 1, wherein each of said numbers has a magnitude and any comparison between any two elements of the matrix is a comparison between the magnitude of a first one of said two elements and the magnitude of the second one of said two elements.

8. The signal processing unit of claim 7, wherein the magnitude $|z|$ of a real or complex number z is defined by one of the following definitions:

$|z|=\operatorname{abs}(x)$ wherein $\operatorname{abs}(x)=x$ if $x\geq 0$ and $\operatorname{abs}(x)=-x$ if $x<0$, provided that $z=x$ is real;

$|z|=\operatorname{mag}(z)=\operatorname{sqrt}(z^{*}cc(z));$ $|z|=\operatorname{ssq}(z)=z^{*}cc(z);$ $|z|=db(z)=\log(z^{*}cc(z)).$ 9. A radar device comprising the signal processing unit of claim 1.

10. A method of searching for peaks in a two-dimensional matrix of numbers, comprising:
    operating a signal processing unit to analyze the matrix row by row and then column by column,
    wherein analyzing a row comprises, for each element of the row, tagging the element in response to determining that the element is a local maximum of the row; and
    wherein analyzing a column comprises determining a bit field associated with the column by determining, for each element of the column, a corresponding bit field element, wherein determining the bit field element comprises:
       if the element of the column has not been tagged, setting the bit field element to a predefined first value, and,
       if the element of the column has been tagged, determining whether the element is a local maximum and in this case setting the bit field element to a predefined second value different from the first value and, otherwise, setting the bit field element to the first value.

11. The method of claim 10, further comprising:
    generating an aggregated list, the aggregated list consisting of those bit fields that include at least positive bit field element that has been set to the second value.

12. The method of claim 10, wherein an element of a row or column is a local maximum of the row or column if it is greater than both its predecessor element and its successor element in the row or column,
    or wherein the element of the row or column is a local maximum of the row or column if it is greater than its predecessor element in the row or column and greater than or equal to its successor element in the row or column,
    or wherein the element of the row or column is a local maximum of a row or column if it is greater than or equal to its predecessor element in the row or column and greater than its successor element in the row or column.

13. The method of claim 10, wherein a threshold is defined and wherein the element of the row or column is a local maximum of the row or column if it is greater than the threshold, greater than a first one of its predecessor element and its successor element in the row or column, and also greater than or equal to a second one of its predecessor element and its successor element in the row or column.

14. The method of claim 10, wherein the first element of a row or column has the last element of the row or column as one of its two nearest neighboring elements and wherein the last element of the row or column has the first element of the row or column as one of its two nearest neighboring elements.

15. The method of claim 10, wherein each of said numbers has a magnitude and any comparison between any two elements of the matrix is a comparison between the magnitude of a first one of said two elements and the magnitude of the second one of said two elements.

* * * * *